(12) United States Patent
Buck

(10) Patent No.: US 8,914,305 B2
(45) Date of Patent: Dec. 16, 2014

(54) METHOD AND APPARATUS FOR MOTION BASED TARGET PREDICTION AND INTERACTION

(75) Inventor: Brian J. Buck, Lisle, IL (US)

(73) Assignee: Trading Technologies International, Inc., Chicago, IL (US)

(*) Notice: Subject to any disclaimer, the term of this patent is extended or adjusted under 35 U.S.C. 154(b) by 131 days.

(21) Appl. No.: 12/827,861

(22) Filed: Jun. 30, 2010

(65) Prior Publication Data

US 2012/0005058 A1    Jan. 5, 2012

(51) Int. Cl.
*G06Q 40/00* (2012.01)
*G06Q 40/04* (2012.01)

(52) U.S. Cl.
CPC .................................... *G06Q 40/04* (2013.01)
USPC .................................. 705/37; 705/35; 705/39

(58) Field of Classification Search
CPC ...................................................... G06Q 40/04
USPC ...................................................... 705/35–45
See application file for complete search history.

(56) References Cited

U.S. PATENT DOCUMENTS

| | | | |
|---|---|---|---|
| 5,598,183 A | 1/1997 | Robertson et al. | |
| 5,839,117 A | 11/1998 | Cameron et al. | |
| 6,362,842 B1 * | 3/2002 | Tahara et al. | 715/856 |
| 7,228,289 B2 | 6/2007 | Brumfield et al. | |
| 7,389,258 B2 | 6/2008 | Brumfield et al. | |
| 7,447,655 B2 | 11/2008 | Brumfield et al. | |
| 7,546,550 B1 | 6/2009 | Buck | |
| 7,580,883 B2 | 8/2009 | Borts | |
| 7,616,191 B2 * | 11/2009 | Matta | 345/168 |
| 7,624,066 B2 | 11/2009 | Janowski et al. | |
| 7,627,517 B2 | 12/2009 | Badenhorst et al. | |
| 7,676,411 B2 | 3/2010 | Kemp, II et al. | |
| 7,805,355 B2 | 9/2010 | Wigzell | |

(Continued)

FOREIGN PATENT DOCUMENTS

| | | |
|---|---|---|
| GB | 2348520 A | 10/2000 |
| JP | S62-152039 A | 7/1987 |

(Continued)

OTHER PUBLICATIONS

Accot, J. and Zhai, S., "Beyond Fitts' Law: Models for Trajectory-based HCI tasks," *Proceedings of the CHI' 1997 Conference on Human Factors in Computing Systems*, Mar. 22-27, 1997, New York: ACM, pp. 295-302.

(Continued)

*Primary Examiner* — Charles Kyle
*Assistant Examiner* — Chia Yi Liu
(74) *Attorney, Agent, or Firm* — McDonnell Boehnen Hulbert & Berghoff LLP

(57) ABSTRACT

Embodiments for motion based target prediction and interaction are described herein. One example embodiment includes predicting a target element based on a user moving a cursor in relation to a trading interface. When a target element is identified, one or more actions may be pre-configured based on the target element. For example, when a target element is associated with a buy action and a price, an order message to buy a tradeable object at the price may be generated based on the predicted target element. Then, a user action may be received to select the target element and to execute the action. The user action selecting the target element may be received prior to the cursor reaching the desired target.

19 Claims, 11 Drawing Sheets

(56) References Cited

U.S. PATENT DOCUMENTS

| | | |
|---|---|---|
| 8,027,908 B2 | 9/2011 | Borts |
| 8,037,422 B1 | 10/2011 | Buck |
| 8,086,519 B2 | 12/2011 | Mylet et al. |
| 8,140,416 B2 | 3/2012 | Borkovec et al. |
| 2002/0054104 A1 | 5/2002 | Berczik et al. |
| 2003/0016252 A1 | 1/2003 | Noy et al. |
| 2003/0126068 A1 | 7/2003 | Hauk et al. |
| 2004/0117292 A1* | 6/2004 | Brumfield et al. ............ 705/37 |
| 2005/0125328 A1* | 6/2005 | Schluetter ..................... 705/37 |
| 2005/0262003 A1 | 11/2005 | Brumfield et al. |
| 2006/0129475 A1 | 6/2006 | Badenhorst et al. |
| 2006/0155626 A1 | 7/2006 | Wigzell |
| 2006/0265316 A1 | 11/2006 | Brumfield et al. |
| 2006/0271467 A1 | 11/2006 | Wasendorf, Sr. |
| 2007/0067744 A1* | 3/2007 | Lane et al. .................. 715/860 |
| 2007/0118452 A1 | 5/2007 | Mather et al. |
| 2007/0198432 A1 | 8/2007 | Pitroda et al. |
| 2007/0265953 A1 | 11/2007 | Cunningham et al. |
| 2007/0273658 A1 | 11/2007 | Yli-Nokari et al. |
| 2007/0294162 A1* | 12/2007 | Borkovec ...................... 705/37 |
| 2010/0035545 A1 | 2/2010 | Ibrahim et al. |
| 2010/0057603 A1* | 3/2010 | Janowski ....................... 705/37 |
| 2010/0176943 A1 | 7/2010 | Snell |
| 2012/0005059 A1 | 1/2012 | Buck |

FOREIGN PATENT DOCUMENTS

| | | |
|---|---|---|
| JP | S64-009517 A | 1/1989 |
| JP | H03-048922 A | 3/1991 |
| JP | H03-265920 A | 11/1991 |
| JP | H04-238524 A | 8/1992 |
| JP | H06-324809 A | 11/1994 |
| JP | H07-234772 A | 9/1995 |
| JP | 2000-305685 A | 11/2000 |
| JP | 2003-508860 A | 3/2003 |
| JP | 2005-523506 A | 8/2005 |
| JP | 2007-519091 A | 7/2007 |
| JP | 2008-508617 A | 3/2008 |
| WO | 2003/090032 A | 10/2003 |

OTHER PUBLICATIONS

Asano, T., et al., "Predictive Interaction Using the Delphian Desktop," *Proceedings of the User Interface Software and Technology 2005 Conference*, Oct. 23-26, 2005, Seattle, Washington, USA, ACM, 2005, 9 pages.

Balakrishnan, R., "'Beating' Fitts' Law: Virtual Enhancements for Pointing Facilitation," *International Journal of Human-Computer Studies*, 2004, vol. 61, pp. 857-874.

Blanch, R. and Ortega, M., "Rake Cursor: Improving Pointing Performance with Concurrent Input Channels," *Proceedings of the CHI' 2009—27th International Conference on Human Factors in Computing Systems*, Boston, MA, Apr. 4-9, 2009, New York, NY: ACM, 2009, pp. 1415-1418.

Blanch, R., et al., "Semantic Pointing: Improving Target Acquisition with Control-Display Ratio Adaption," *Proceedings of the CHI' 2004 Conference on Human Factors in Computing Systems*, Vienna, Austria, Apr. 24-29, 2004, New York, NY: ACM, 2004, pp. 519-526.

Chan, A., "Motion Prediction for Caching and Prefetching in Mouse-Drive DVE Navigation," *ACM Transactions on Internet Technology*, Feb. 2005, vol. 5, No. 1, pp. 70-91.

Chan, A., et al., "A Motion Prediction Method for Mouse-Based Navigation," *Proceedings of the 2001 Computer Graphics International Conference*, Hong Kong, China, Jul. 3-6, 2001, IEEE Computer Society, 2001, 8 pages.

Grossman, T. and Balakrishnan, R., "The Bubble Cursor: Enhancing Target Acquisition by Dynamic Resizing of the Cursor's Activation Area," *Proceedings of the CHI' 2005 Conference on Human Factors in Computing Systems*, Portland, OR, Apr. 2-7, 2005, New York, NY: ACM, 2005, pp. 281-290.

Guiard, Y., et al., "Object Pointing: A Complement to Bitmap Pointing in GUIs," Proceedings of the 2004 Graphics Interface Conference, May 17-19, 2004, London, Ontario, Canadian Human-Computer Communications Society, 2004, pp. 9-16.

Gutwin, C., et al., "Using Cursor Prediction to Smooth Telepointer Jitter," *Proceedings of the 2003 International ACM SIGGROUP Conference on Supporting Group Work*, Nov. 9-12, 2003, Sanibel Island, FL: ACM, 2003, pp. 294-301.

Jiang, B., "Improving Awareness with Remote Control Point Movement Prediction in Real-Time Collaborative Graphics Editing Systems," *International Journal of Computer Science and Network Security (IJCSNS)*, Mar. 2006, vol. 6, No. 3A, pp. 203-207.

Jiang, B., et al., "SDSPM-based User Interest Prediction in Collaborative Graphics Design Systems under Ubiquitous Environment," *Proceedings of the 13th International Conference on Computer Supported Cooperative Work in Design*, CSCWD 2009, Apr. 22-24, 2009, Santiago, Chile, IEEE, 2009, pp. 414-419.

Kabbash, P. and Buxton, W., "The 'Prince' Technique: Fitts' Law and Selection Using Area Cursors," *Proceedings of the CHI' 1995 Conference on Human Factors in Computing Systems*, Denver, CO, May 7-11, 1995, New York, NY: ACM, 1995, pp. 273-279.

Komogortsev, O.V., "Eye Movement Prediction by Oculomotor Plant Modeling with Kalman Filter 2003-2007," Doctoral Dissertation, Kent State University: Kent, OH, 2007, 120 pages.

MacKenzie, I.S. and Buxton, W., "The Prediction of Pointing and Dragging Times in Graphical User Interfaces," *Interacting with Computers*, 1994, vol. 6, pp. 213-227.

MacKenzie, I.S., "Movement Time Prediction in Human-Computer Interfaces," In R.M. Baecker, et al. (Eds.), *Readings in Human-Computer Interaction* ($2^{nd}$ Ed.), Kaufmann: Los Altos, CA, 1992, pp. 1-19.

Oel, et al., "Time Prediction of Mouse-based Cursor Movements," *Proceedings of Joint AFIHM-BCS Conference on Human-Computer Interaction IHM-HCI'2001*. Lille, France: Sep. 10-14, 2001, vol. II, pp. 37-40.

Roussel, N. and Chapuis, O., "UIMarks: Quick Graphical Interaction with Specific Targets," *LRI Technical Repport No. 1520*, Jun. 2009, Laboratoire de Recherche en Informatique, Orsay, France, 4 pages.

Sears, A. and Shneiderman, B., "Split Menus: Effectively Using Selection Frequency to Organize Menus," *ACM Transactions on Computer-Human Interaction*, Mar. 1994, vol. 1, No. 1, pp. 27-51.

Van Mensvoort, K., and Keuning, H. "Cursor Trajectory Prediction Using a Genetic Algorithm (Beta Version)" [online], www.koert.com, n.d. [Retrieved on Mar. 10, 2010] from the Internet: http://www.koert.com/work/cursorpredictor/.

Wexler, M. and Klam, F., "Movement Prediction and Movement Production," *Journal of Experimental Psychology: Human Perception and Performance*, 2001, vol. 27, No. 1, pp. 48-64.

Wobbrock, J.O., et al., "The Angle Mouse: Target-Agnostic Dynamic Gain Adjustment Based on Angular Deviation," *Proceedings of the CHI' 2009-27th International Conference on Human Factors in Computing Systems*, Boston, MA, Apr. 4-9, 2009, New York, NY: ACM, 2009, pp. 1401-1410.

Zhai, S., "Manual and Gaze Input Cascaded (MAGIC) Pointing," *Proceedings of the CHI' 1999 Conference on Human Factors in Computing Systems: The CHI is the Limit*, Pittsburg, PA, May 15-20, 1999, New York, NY: ACM, 1999, pp. 246-253.

International Search Report and Written Opinion for PCT Patent Application No. PCT/US11/42268, completed Sep. 28, 2011.

U.S. Appl. No. 12/827,881, Non-Final Office Action mailed Feb. 9, 2012.

U.S. Appl. No. 12/827,881, Response to Non-Final Office Action filed May 9, 2012.

International Search Report and Written Opinion of International Application No. PCT/US2011/042373, dated Sep. 23, 2011 (mailed Oct. 6, 2011).

U.S. Appl. No. 12/827,881, Final Office Action mailed Jun. 14, 2012.

U.S. Appl. No. 12/827,881, Response to Final Office Action filed Aug. 14, 2012.

U.S. Appl. No. 12/827,881, Advisory Action mailed Aug. 27, 2012.

U.S. Appl. No. 12/827,881, RCE and Response filed Sep. 10, 2012.

U.S. Appl. No. 12/827,881, Notice of Allowance mailed Oct. 9, 2013.

Kulkosky, V. (1988). Mouse shows boldness of market automation system. Wall Street Computer Review, 5(8), 12. Retrieved Sep. 13, 2013.

U.S. Appl. No. 14/151,366, Office Action mailed Mar. 12, 2014.

* cited by examiner ical trading is the CME® Globex® electronic trading platform, which is offered by the Chicago Mercantile Exchange Group; though the inventions described herein are not limited to derivatives trading.
METHOD AND APPARATUS FOR MOTION BASED TARGET PREDICTION AND INTERACTION

FIELD OF INVENTION

A number of inventions are disclosed herein that are directed towards motion based target prediction and interaction. More specifically, a number of inventions are directed to setting or computing a plurality of parameters, such as trade order parameters, using movement prediction techniques applied in relation to a user input device and a graphical user interface.

BACKGROUND

An electronic trading system includes an electronic matching system for tradable items, such as stocks, options, and commodities. The electronic trading system often includes an electronic exchange to perform the order matching. The electronic exchange also provides market data and trade confirmation data, among other things, to subscribing trading devices. By way of illustration, an electronic exchange in derivatives trading is the CME® Globex® electronic trading platform, which is offered by the Chicago Mercantile Exchange Group; though the inventions described herein are not limited to derivatives trading.

To trade in an electronic trading system, a person (commonly a trader) uses a trading device to receive and electronically process data from the electronic exchange. The trading device generally outputs the information to the person via one or more display screens. The person may also interact with the computer and the information using an input device, such as a mouse or keyboard or both. Regardless of the actual user input device being used, a cursor, also referred to as a pointer, is displayed on a screen. In relation to graphical user interfaces, a cursor is a visible and moving object or pointer that a user may control with an input device. In relation to a trading interface, a user may move the cursor to a desired selection area on the trading interface and enter a keystroke input at the selection area to set various trade order parameters and/or to perform other actions, such as, for example, to generate a command to send a trade order to an electronic exchange.

The success of a trader who trades in a competitive electronic trading environment depends on many factors. One of the factors is how fast a trader can make a trade. The faster and more flexible a trader can trade, the less likely it will be that the trader will miss the trader's price and more likely the trader will make money. This is especially true when a first-in, first-out matching method is used at an electronic exchange, where the speed at which an order is sent to and reaches the electronic exchange often determines whether the order will be matched. Because the success and profitability of a trader depends on speed, it is desirable to offer tools that can assist the trader in making trades as quickly as possible and at the best possible prices.

BRIEF DESCRIPTION OF THE DRAWINGS

The following will be better understood by a person skilled in the art when read in conjunction with the figures which show various example embodiments. The figures are for the purpose of illustrating example systems and methods according to certain embodiments, but it is understood that the various inventions, described herein, are not limited to the arrangements and instrumentality shown in the figures.

DETAILED DESCRIPTION

Figure 1:
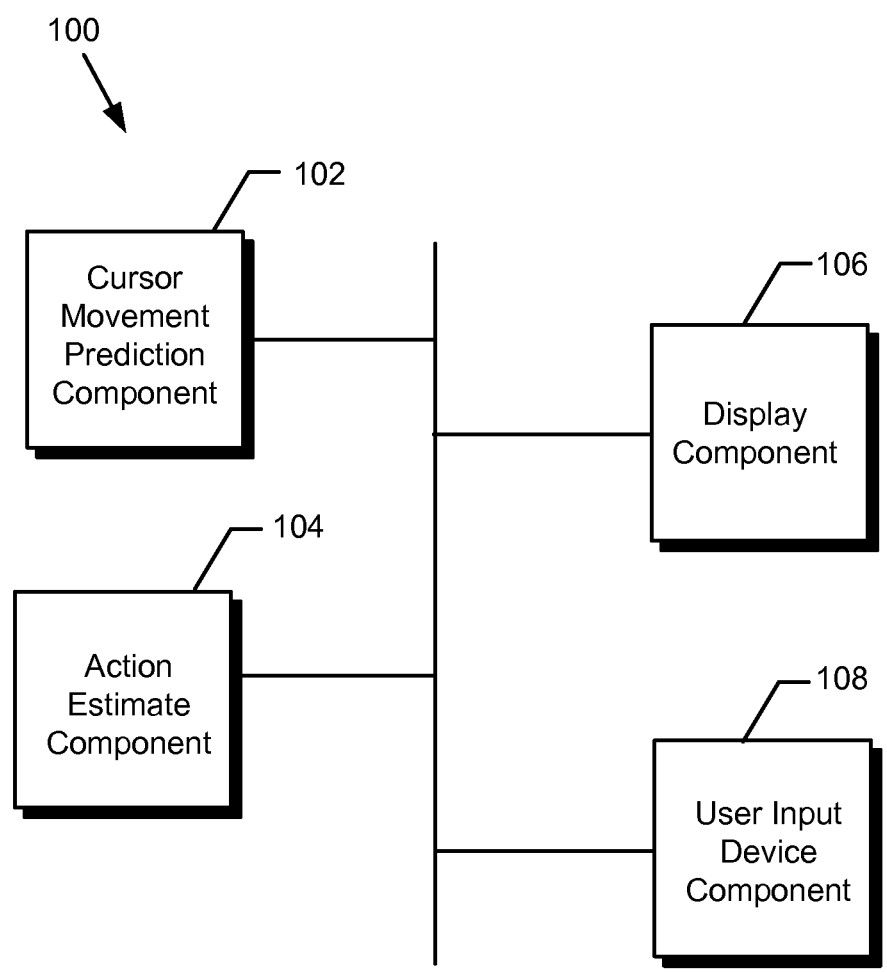
FIG. 1 is a block diagram of a system that can be used to perform various embodiments described herein.

There are a number of inventions described herein that relate to systems and methods for interacting with user-selectable targets on a graphical user interface. More specifically, various cursor movement prediction methods are used to predict one or more selectable targets and to allow a user interaction with the predicted target prior to a cursor of a user input device reaching a desired target.

In the context of electronic trading, the success of a trader often depends on how fast a trader may respond to various changing market conditions and how fast the trader can enter and send a trade order. Even an action as simple as moving a cursor on the screen to a target location can take as much as 500 to 1000 milliseconds. Any technique that can reduce this time by even 10-100 milliseconds will actually make a difference to the trader in terms of success and profitability, as the trader will be able to have his order at an electronic exchange faster than other traders. The embodiments described herein take into consideration the importance of speed and allow a trader to enter orders quickly and efficiently.

As will be described in greater detail below, when a cursor of a user input device is being repositioned in relation to a graphical user interface, a user is making an intentional spatial action moving the cursor from one location, i.e., a start point, to a goal location, i.e., a target point. According to the embodiments described herein, one or more possible target points or elements are determined by tracking the cursor's location, trajectory, movement direction, speed and/or acceleration as a cursor is being moved by a user input device in relation to a graphical user interface. As the target elements are identified, a user may interact with the target elements prior to a cursor of a user input device reaching the desired element. The user interaction may involve selecting a desired target element and/or performing a certain action associated with the desired target element.

Additionally, prediction data may be used to preset one or more parameters associated with one or more events or actions to be performed upon selecting a predicted target element. For example, when the example cursor tracking prediction methods are used in relation to a trading interface, one or more trade related messages may be generated prior to a cursor reaching a desired target location on the trading interface. The generated messages may include one or more trade order parameters determined based on the predicted target locations. Then, one or more actions of a user input device, such as selecting a desired target location at the time when a cursor is positioned over the desired target location or prior to reaching the desired target location, may send one of the pre-generated trade related messages to an electronic exchange.

As will be described in greater detail below, a user may interact with one or more potential target locations that are determined using cursor prediction methods when a pointer of a user input device reaches the potential target location. Alternatively, a user may interact with a potential target location before a pointer of a user input device reaches the target. In such an embodiment, one or more actions or events associated with the potential target may be initiated before the potential target is selected by a user.

Before explaining any further, it is worth noting again that the various inventions are not limited in their application to the details of design and the arrangement of the components set forth in the following description or illustrated in the drawings. The inventions are capable of other embodiments or of being practiced or carried out in various ways.

I. Example System

FIG. 1 is a block diagram of a system 100 that can be used to perform various methods described herein. The system 100 includes a cursor movement prediction component 102, an action estimate component 104, a display component 106, and a user input device component 108.

The display component 106 is in communication with the cursor movement prediction component 102, the action estimate component 104, and the user input device component 108. According to one example embodiment, the components 102-108 may be part of a client device. An example client device is a desktop computer or a server computer. According to another example embodiment, some components may be part of a client device, while others may be located at a different device in communication with the client device.

The display component 106 displays, on a display screen of a computer, a graphical user interface. The display screen could be a conventional display (CRT, LCD, OLED, electronic paper, etc.) or a projection display. Alternatively, the display screen may include a display on a head-mounted device, an augmented reality device, or a mediated reality device. Further alternatively, a plurality of different displays could be used, some of which having display elements superimposed on other elements. The graphical user interface may include one or more user interface elements, such as locations, areas, icons, or buttons that are selectable by a user with a cursor of a user input device position over a desired user interface element. Alternatively, using the cursor prediction methods described below, a user interface element may be selected prior to a cursor reaching the user interface element. In some embodiments, a user interface element may be associated with a specific location or area of an interface. Additionally, a user interface element may take a format of a button or an icon that is displayed on a user interface and that is selectable by a user input device.

In some embodiments, a user interface element allows a user to trigger an event or confirm an action, for example. User interface elements may have different sizes or shapes. For example, a user interface element may be rectangular, round, rounded, triangular, or yet of any other shape, if so programmed. A user may select a user interface element using the user input device component 108. The user input device component 108 may include a physical input device, a device driver, and software program for handling user inputs and providing it to an application program. For example, a user interface element may be selected by positioning a cursor of the user interface over the target element and clicking it with a cursor controlled by a mouse device. A cursor may be controlled by mouse, keyboard, trackball, or some other user input device. It should be understood that other inputs such as a keystroke could also be used to execute a function of a user interface element. It should be understood that more than one pointing device could also be used (e.g., two mice, or two cursors for a touch screen interface), each with its own cursor. Using cursor prediction methods described in greater detail below, a user can interact with a target user interface element by clicking while still outside the location or area corresponding to the target element. In such an embodiment, a visual indicator can be used in relation to a predicted target element to indicate the predicted target element that can be selected by a user.

A user interface element may require a user to simply press down on a mouse button to execute the function, click only once to execute the function, or the user interface element may require two or more clicks to execute the function (e.g., a double click). It should be understood that other inputs, such as a keystroke, could also be used to select a desired user interface element and to execute a function associated with the selected element. Thus, it should be understood that selecting a user interface element or clicking on a user interface element refers to any act of selection, and can include any of a mouse down action only, a single click of a mouse button, a double-click of a mouse button, a key press on a keyboard, or a combination of inputs, and so on. In some embodiments, selecting a user interface element sends a command to the program and/or computer to execute (or initiate) a predetermined function. A user interface element might also indicate on the display screen when it has been selected.

The cursor movement prediction component 102 may predict a target interface element using one or more cursor track prediction methods. While certain cursor track prediction methods will be described below, it should be understood that other existing or future cursor track prediction methods could be used as well by the cursor movement prediction component 102. Some example track prediction methods include: linear prediction methods, angular change prediction methods, or prediction methods which use historical data, such as simple order linear prediction models, linear regression models, Bayesian models, or Hidden Markov Models. Additionally, track prediction methods could use velocities and accelerations of a moving cursor to determine a target element on an interface. Prediction models which use such information include Kalman filters, also known as Linear Quadratic Estimation ("LQE") filters. Additionally, some prediction models, such as Kalman filters, may use various estimates of statistical characteristics of noise involved in position measurements. In relation to the cursor track prediction methods, the noise may correspond to imprecision and local errors by a user operating a user input device.

The cursor movement prediction component 102 may also use additional methods separately or in combination with various prediction models, such as the ones described above. For example, one additional method may use information about user's individual history of cursor motion tracks. Such a method could employ one or more data mining techniques applied to motion tracks in order to make predictions for future motions, including, in certain embodiments, eventual target selection. It should be understood that the cursor movement prediction component 102 could use any number of independent motion prediction methods in parallel. Additionally, as will be described in greater detail below, a probability or likelihood of selection could be assigned to various predictions. In such an embodiment, one or more prediction targets could be eliminated from the predicted set when a threshold of selection for the targets reaches a predetermined level.

When used in relation to a trading environment, the cursor movement prediction component 102 could also use trade related data or market related data in making cursor motion predictions. Additionally, market movement or product trading history could be used as well to add or eliminate certain predicted targets.

As mentioned earlier, the cursor movement prediction component 102 could also include logic that assigns probability of selection factor to various target elements. The probability factors may then be used to eliminate certain target elements. Different methods could be used to reduce the number of possible target elements.

Additionally, it should be understood that the cursor track prediction component 102 can examine every position or substantially every position of the cursor as it moves. Alternatively, the cursor's position can be evaluated periodically, or can be event driven where the cursor movement prediction component 102 receives update events from the user input device component 108 on changes of the cursor's positioning. It should be understood that the user input device component 108 can also receive queries from the cursor movement prediction component 102 and the display component 106 to provide updates on changes of the cursor's positioning.

Referring back to FIG. 1, the action estimate component 104 may use the prediction data provided by the cursor movement prediction component 102 to prepare for or to take certain actions based on predicted target elements. It should be understood that the component 104 may be configured to dynamically update any action estimations or actions to be taken based on the prediction data updates. When used in relation to a trading interface, the action estimate component 104 may pre-generate order messages with a plurality of trade order parameters determined based on target prediction data. As will be described in greater detail below, certain regions of a trading interface may be associated with a distinct value for one or more order parameters. When a cursor of a user input device moves, the prediction component 102 determines a predicted track of the cursor. The predicted track may intersect a region on a trading interface that is associated with a specific value for a particular order parameter. When the selection cursor moves, it is possible to make one or more new predictions of a future cursor track. If the predicted track intersects a different region, then the order parameter may be changed to reflect the new prediction. When the cursor actually enters a particular region which is associated with a particular value of a particular order parameter, the action estimate component 104 may suspend the parameter update process, as the proper order parameter value(s) might have already been pre-set. Various other embodiments for selecting desired regions and setting order parameters will be described in greater detail below.

It should be understood that various values of certain state variables, such as variables associated with commands or actions taken when a user input action is made by a user, could be preset based on predicted target elements in advance of the user input action to issue or execute the application command or action. When the example embodiments are used in an electronic trading environment, various trade order parameters could be preset based on predicted target elements on an interface. Example trade order parameters may define an order as a buy order or a sell order, and may also include an order type, such as a limit order, a stop order, etc., an order price, an order quantity, and many other parameters. As the trade order parameters are pre-set based on the predicted targets, the action estimate component 104 may also generate trade order messages including the pre-set parameters. For example, if a predicted trade order parameter is for an order to buy associated with a specific price and quantity, the action estimate component 104 may generate a trade order message including the price and the quantity for a buy order. Different parameters could also be preset in the order message.

As mentioned above, the action estimate component 104 could also prepare for certain actions to be taken based on one or more predicted target elements on an interface. For example, a trading interface may include a selection icon that allows a trader to cancel all of his working orders at an electronic exchange. If such a selection icon is predicted to be a possible target, the action taking component 104 may pre-generate a transaction message including a request to cancel all working orders. According to another example, if a predicted target includes a icon that can be activated to modify a display of the trading screen, such as to re-position market information displayed on the trading screen, the action taking component 104 may initiate the process of modifying the trading screen prior to a cursor reaching the target icon. According to one example embodiment, the action taking component 104 may initiate an action associated with a target icon upon identifying the target icon and detecting a predetermined user input that occurs prior to a cursor reaching the target icon. Various embodiments for initiating actions prior to the cursor reaching a desired destination will be described in greater detail below.

As explained above, the action estimate component 104 may prepare order related messages prior to a cursor reaching a target element based on prediction data provided by the cursor movement prediction component 102. In an alternative embodiment, all valid order related messages for all valid prices and order parameters, as well as order related action messages, such as order cancellations, may be prepared in advance. For example, all possible pre-generated messages may be stored in a database. Then, prediction data may be used as a pointer to select specific messages in the database. Regardless of how and when various messages are generated in the example embodiments, a user may also interact with a target element prior to a cursor of a user input device reaching the target element.

Figure 2:
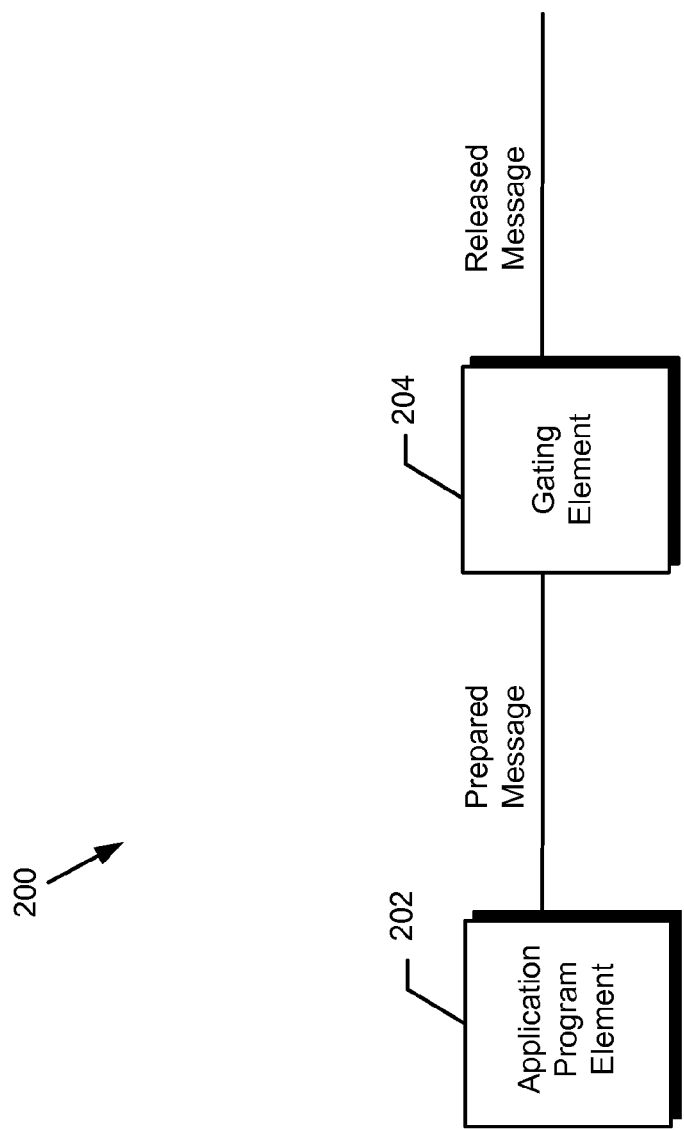
FIG. 2 is a block diagram of a system that can be used to provide an order message to an electronic exchange.

In addition to preparing one or more order related messages or order related actions in advance based on prediction data, additional steps may be taken to allow a desired message to reach an exchange even faster. FIG. 2 is a block diagram of a system 200 that can be used to provide an order message to an electronic exchange. While FIG. 2 is described in relation to a trading environment, it should be understood that the example embodiments could also be used in different technical environments. The system 200 includes an application program element 202 and a gating element 204. The application program element 202 may prepare an order message to be sent to an electronic exchange. According to one example embodiment, order messages may be prepared using the movement prediction methods described herein; however, various other messages not using the movement prediction methods could be prepared as well. Once an order message is prepared, the application program element 202 provides the prepared order message to the gating element 204.

When the application program element 202 prepares an order message, the message is typically further processed before it is placed onto the physical communications medium. The processing of the message may involve getting the message into the operating system's protocol stack, a device driver for a network adapter, and then into the network adapter itself before the message is put on the wire, or onto the physical communications medium. All these steps may take additional time. According to the embodiment of FIG. 2, the gating element 204 is located at one or more elements inside the process flow between the application program and the physical communications medium. When the application program element 202 prepares one or more messages, the application program element 202 pushes the message onto the gating element 204 as if a user had already taken an action to send the prepared message. Once the gating element 204 receives the prepared message(s), the gating element 204 may store the received message(s). The gating element 204 may then release the stored message(s) onto the physical communications medium upon detecting a certain signal from the application program element 202. The signal may be generated by the application program element 202 upon detecting a user initiated action or a computer initiated action to send the stored message(s) and/or to cancel incorrect predictions. Using such an embodiment, processing of the message(s) may be finished ahead of time, thus shortening the time of one or more messages reaching an electronic exchange.

It should be understood that the gating element 204 could be located at any element between the application program and the physical communication medium. For example, the gating element 204 may be located anywhere within the protocol stack, at a network adapter, within the operating system's device driver for the network adapter, or within a module of the operating system's software that communicates with the device driver. The gating element 204 could also be located further along the network path between a client device and an exchange, such as at a gateway or yet a different network device. In such an embodiment, the application program element 202 may provide signals to the gating element 204 to release and/or cancel one or more pre-stored messages at the gating element 204. The signaling operation may be provided via a trading network or another network designated for signaling purposes. Further, alternatively, the gating element 204 may be located at or near an electronic exchange. In such an embodiment, one or more orders may be held at the gating element 204 for later execution when signaled by a trader. It should be understood that each order to be held at the gating element 204 may include an identifier that indicates that a predefined signal is required to release the order from the gating element 204. In such an embodiment, when a signal is generated by the application program element 202 or yet some other component, the signal may include an identifier of an order to be released. Different embodiment for providing a signal to release a prepared order or to identify one or more orders could also be used.

II. Example Linear and Angular Change Cursor Track Prediction Methods

Figure 3:
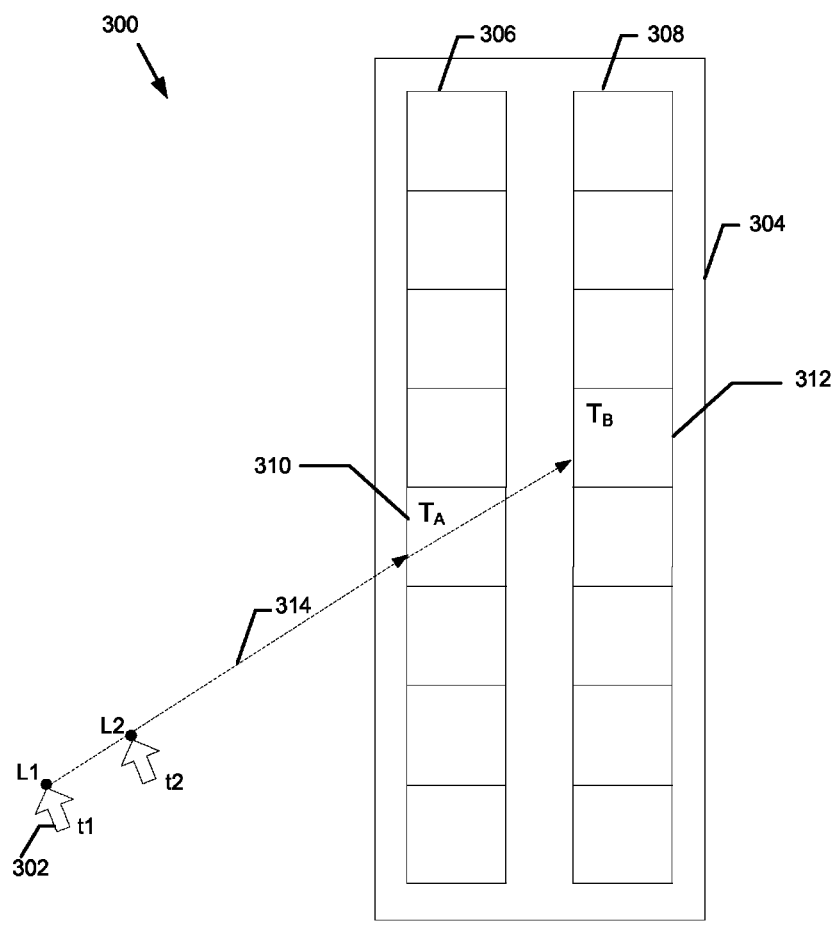
FIG. 3 is a block diagram illustrating an example linear cursor track prediction method used in relation to an example interface.

FIG. 3 is a block diagram 300 illustrating an example linear cursor track prediction method applied in relation to an example interface. As shown in FIG. 3, a cursor 302 is positioned in relation to an interface 304 having two regions 306 and 308. Each region has a number of selectable elements, such as a target element ("$T_A$") 310 in the first region 306, and a target element ("$T_B$") 312 in the second region 308. FIG. 3 shows two locations of the cursor 302 in relation to the interface 304. At time "$t_1$," the cursor 302 is shown at the first location ("L1"). Then, at time "$t_2$," the cursor is repositioned by a user input device to a new location ("L2"). A simple linear prediction method based on the two locations may be used to generate a prediction track indicated with a dotted line 314. It should be understood that the interface 300 may be configured to display the prediction track, such as the dotted line 314. Various other indicators could be used as well. As shown in FIG. 3, the prediction track 314 intersects the first region 306 at the location of the first target element 310. Then, if the prediction track 314 is extended to the second region 308, it intersects the second region 308 at the location corresponding to the second target element 312. According to one example embodiment, the first target element 310 may be associated with a first parameter and/or a first action, while the second target element 312 may be associated with a second parameter and/or a second action.

It should be understood that if an interface includes multiple regions, with each region having a selectable element that is intersected by a prediction track, such as shown in FIG. 3, one example method may take into consideration all target elements that are intersected by the prediction track. In such an embodiment, when a user intends to take an action in relation to one of the predicted target elements prior to the cursor reaching that element, the user may indicate a desired target element with a specific user input, such as by selecting a key on a keyboard, or by depressing one of the mouse buttons. Alternatively, rather than analyzing all target elements in multiple region, one example method may take certain actions based on a target element of the region that is intersected first by a prediction track, such as the element 310 in the first region 306 of FIG. 3, while not taking into consideration target elements in other regions that could be also intersected by the prediction track, such as the element 312 in the second region 308. Further, alternatively, all possible messages may be pre-generated ahead of time, as explained above, and cursor prediction data may be used to select and/or eliminate specific messages. Various other embodiments are possible as well.

As the cursor is being moved in relation to the interface 304 along the prediction track 314, the interface 300 may be configured to provide a graphical indicator in relation to one or both target elements. According to one example embodiment, the graphical indicator may be displayed in many different formats. For example, a target element determined based on a prediction track may be color-coded or shaded. According to another example embodiment, a target element may be indicated by altering the display of a plurality of other elements on the interface 304. For example, all areas of the interface could be graphically changed except for the indicated target element(s). In such an embodiment, the target elements may have their original appearance, while the remaining portions of the interface may be graphically modified. However, different indicators could also be used.

Figure 4:
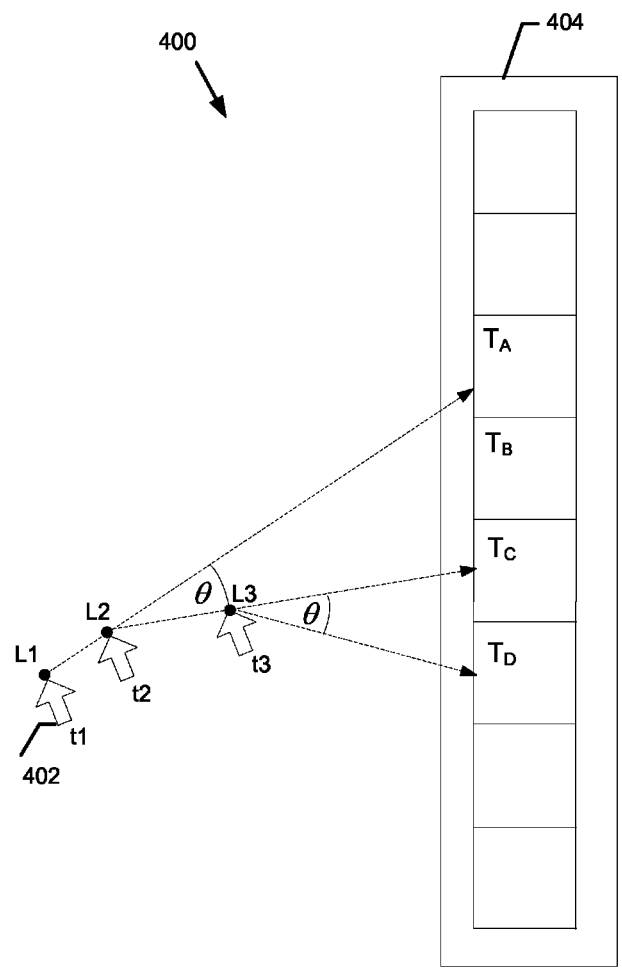
FIG. 4 is a block diagram illustrating an example angular change cursor track prediction method in relation to an example interface.

FIG. 4 is a block diagram 400 illustrating another example embodiment of a cursor track prediction method that uses a cursor's angular change to determine one or more possible target elements. As shown in FIG. 4, a cursor 402 is positioned in relation to an interface 404. At time "$t_1$," the cursor 402 is shown at a first location ("$L_1$"). Then, subsequently, at "$t_2$" and "$t_3$," the cursor 402 is repositioned by a user input device to a second location ("$L_2$") and a third location ("$L_3$"), respectively. The first linear prediction could generate the first prediction target $T_A$, and the second linear prediction could generate the second prediction target $T_C$. As shown in FIG. 4, the simple linear prediction from $L_1$ to $L_2$ forms an angle ("θ") with the simple linear prediction from $L_2$ to $L_3$. According to one example embodiment, the angular change between the two predictions may be used to generate a different track prediction, which is at the same angle ("θ") as the linear prediction from $L_2$ to $L_3$. The predicted target generated using such a method is shown at $T_D$. A variant of this method could generate multiple prediction targets, e.g., the targets from the previous two linear predictions ($T_A$ and $T_C$), the target from the second prediction ($T_D$), and all potential targets in between, such as a target $T_B$.

As explained above, various other track prediction methods could also be used. It should be understood that the example embodiments described herein are not limited to any specific cursor track prediction method, and any track prediction methods could be combined as well.

III. Example Track Prediction and Interaction Method

Figure 5:
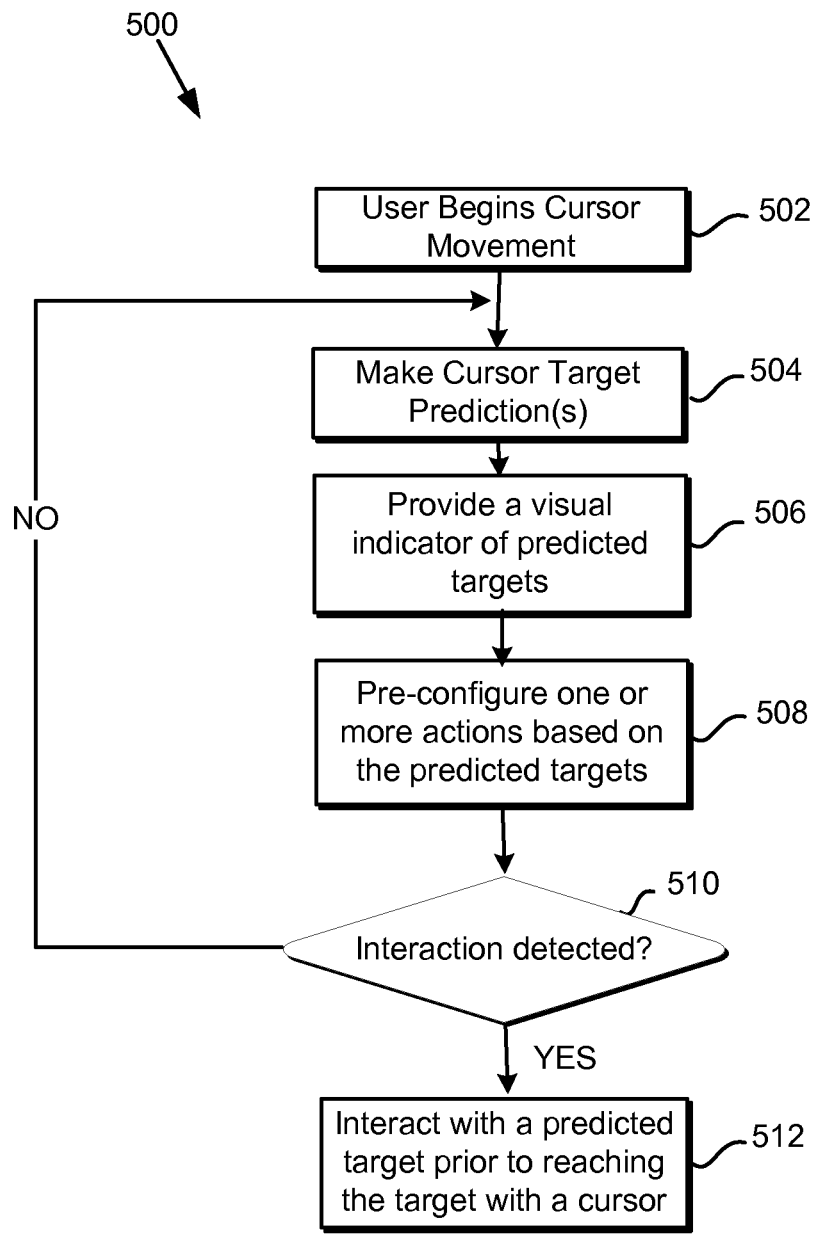
FIG. 5 is a flowchart illustrating an operation of certain embodiments described herein.

FIG. 5 is a flowchart 500 illustrating an operation of certain embodiments described herein. The flowchart 500 shows the functionality and operation of certain embodiments. In this regard, each block may be implemented alone or in combination in various forms of hardware, firmware, or as a set of instructions in software, for example. Certain embodiments may be provided as a set of instructions residing on a computer readable medium, such as a memory, hard disk, CD-ROM, DVD, or EPROM, for execution on a computer or other processing device. Alternative implementations are included within the scope of the example embodiments of in which functions may be executed out of order from that shown in flowchart 500 or discussed, including substantially concurrent or in reverse order, depending on the functionality involved, as would be understood by those skilled in the art.

At step 502, a user begins movement of a cursor in relation to a graphical user interface including one or more selectable elements. At step 504, based on the cursor's movement, an initial target prediction is made. As discussed above, the initial target prediction may include a single target element or multiple target elements. At step 506, a visual indicator is provided in relation to each predicted target element. As discussed herein, various methods could be used to visually indicate the predicted target elements. In addition to graphically indicating the prediction targets, a prediction track could be displayed as well. At step 508, one or more actions/parameters may be taken/preconfigured based on the identified target element. For example, if a target element is associated with a certain action to be taken, such as sending a message with one or more parameters, the message may be pre-generated upon identification of the target element. Alternatively, as explained above, all possible messages and actions to be taken may be pre-generated in relation to the interface ahead of time and stored in a database. In such an embodiment, the prediction data could be used to point to or select specific pre-generated messages. Further, alternatively, one or more actions may be taken based on a prediction data upon detecting a predetermined user input prior to a cursor of a user input device reaching a desired target element. For example, upon detecting a predetermined action, one or more messages may be generated based on the prediction data. Further, alternatively, upon identifying a target element, a price for an order may be set based on the identified target element. Then, another action may be used to generate an order message with the identified price.

It should be understood that the example embodiments described herein are not limited to using prediction data in relation to trading interfaces, and could be applied in various other environments as well. For example, when the methods are used in relation to menu interfaces, a target element may be associated with a drop-down menu, and selection of the target element may result in a display of the drop down menu having a number of selectable elements. In such an embodiment, various actions associated with the number of selectable elements on the drop-down menu may be pre-configured before the target element is selected.

At step 510, it is determined if a user interaction is detected in relation to one of the target elements. As explained earlier, according to one example embodiment, a user may interact with predicted target elements prior to a cursor reaching a desired target element. For example, a user may enter a predetermined input to select a desired target element prior to the cursor reaching that element. If the user interaction is detected, at step 512, one or more actions may be taken based on the target element selected by a user, such as sending a pre-generated order message to an electronic exchange. If there is no user interaction with one of the predicted target elements, a user may continue the cursor movement, and the method continues at 504 when new target predictions may be made as the cursor is moved by the user in relation to the interface.

According to one embodiment, a movement prediction mode may be provided to allow a user to activate and de-activate the movement prediction methods described herein. The movement prediction mode may be activated upon detecting a predetermined user action, such as, a predetermined user input, such as holding down a key, or detecting a cursor of a user input device in a specific area of a graphical user interface. A user could exit the movement prediction mode upon taking another predetermined action. Alternatively, the movement prediction mode may be disabled upon expiration of a preset time period combined with another event, such as a user not moving a cursor during the preset time period. It should be understood that some other action, or a combination of different actions, could be used to activate and deactivate the movement prediction mode.

When a user enters the movement prediction mode, various actions may be initiated to select a target. One or more user initiated actions, such as a mouse-click, may be devoted solely to taking actions based on the predicted target element, and not based on any other element of an interface the mouse cursor may be actually over at the time of the action, i.e., mouse-click. It should be understood that one or more other selection methods could be used as well.

While the example embodiments below are directed to trading interfaces, it should be understood that the example various methods described herein are not limited to a trading environment. The example methods could be applied in other environments that involve using one or more graphical user interfaces.

IV. Example Electronic Trading System

Figure 6:
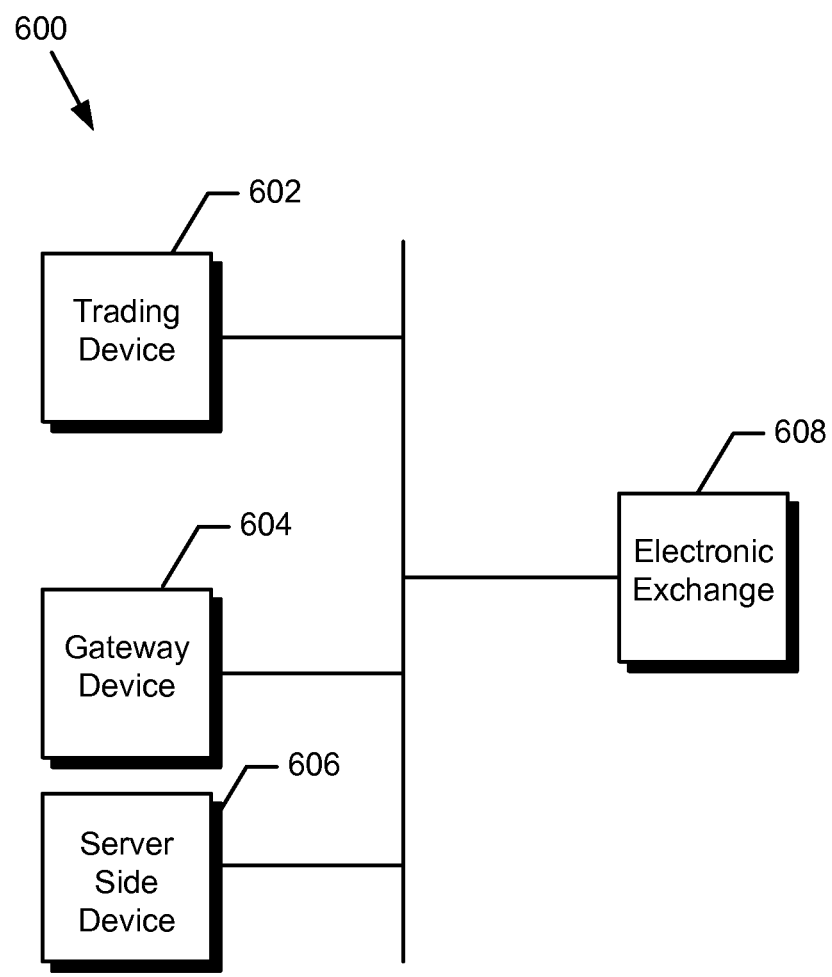
FIG. 6 is a block diagram illustrating an example trading system for employing certain embodiments described herein.

FIG. 6 is a block diagram illustrating an example system 600 for employing certain embodiments described herein. System 600 includes a trading device 602 and an electronic exchange 608. The system 600 may also include a gateway device 604 and a server side device 606. According to the example of FIG. 6, the trading device 602 is in communication with the gateway 604, which is in communication with the electronic exchange 608.

Before elaborating on system 600, it is understood that the components described in FIG. 1 may be implemented at one or more blocks described in FIG. 6. For example, the trading device 602 might implement all of the components 102, 104, and 106 described in FIG. 1. Alternatively, trading device 602 might implement less than all of the components; for example, trading device 602 might only include the display component 106. Likewise, the gateway device 604, the server side device 606, and the electronic exchange 608 might each implement one or more components of system 100. That is, it is understood that a particular device 602, 604, 606, and 608 might implement all of system 100, just a portion of system 100, or a modified version of system 100. Also, it should be understood that more than one trading device could also be used by a user. In such an embodiment, one trading device may implement a portion of the system in FIG. 1, while another trading device may implement another portion. For example, a display component could be implemented on a different trading device from the trading device implementing the cursor movement prediction or action estimate.

In operation to trade, the trading device 602 may be used to send orders to buy or sell tradable objects at the exchange 608. The orders are sent through the gateway 604 to the exchange 608. In addition, market data is sent from the exchange 608 through the gateway 604 to the trading device 602. The trading device 602 may also be used to monitor this market data and base a decision to send an order for a tradable object on the market data.

The trading device 602 may include one or more electronic computing platforms such as a hand-held device, laptop, desktop computer, workstation with a single or multi-core processor, server with multiple processors, and/or cluster of computers, for example.

The trading device 602 may include one or more trading applications. The trading application(s) may, for example, process market data by arranging and displaying the market data in trading and charting windows. This processing may be based on user preferences, for example. By way of illustration, the trading device 602 may be a computing system running a copy of X_TRADER™, an electronic trading platform provided by Trading Technologies International, Inc. of Chicago, Ill.

The trading device 602 may include an electronic trading workstation, a portable trading device, an algorithmic trading or "black-box" system, an embedded trading system, and/or an automated trading tool, for example. The trading application(s) may include an automated trading tool such as an automated spread trading tool, for example.

The trading device 602 may be adapted to send orders to buy or sell tradable objects. The trading device 602 may also be adapted to cancel orders, change orders, and/or query an exchange, for example.

The orders sent by the trading device 602 may be sent at the request from a user or automatically, for example. For example, a trader may utilize an electronic trading workstation to place an order for a particular tradable object, where the order includes various parameters, such as an order price and/or quantity. As another example, an automated trading tool may calculate one or more parameters for an order and automatically send the order. In some instances, an automated trading tool may prepare the order to be sent but not actually send it without confirmation from the user. Order parameters may also be determined using various cursor track prediction methods discussed herein.

In certain embodiments, the trading device 602 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, the orders from the trading device 602 are sent to the exchange 608 through the gateway 604. The trading device 602 may communicate with the gateway 604 using a local area network, a wide area network, a virtual private network, a T1 line, a T3 line, an ISDN line, a point-of-presence, and/or the Internet, for example.

The gateway 604 is adapted to communicate with the trading device 602 and the exchange 608. The gateway 604 facilitates communication between the trading device 602 and the exchange 608. For example, the gateway 604 may receive orders from the trading device 602 and transmit the orders to the exchange 608. As another example, the gateway 604 may receive market data from the exchange 608 and transmit the market data to the trading device 602.

In certain embodiments, the gateway 604 performs processing on data communicated between the trading device 602 and the exchange 608. For example, the gateway 604 may process an order received from the trading device 602 into a data format acceptable by the exchange 608. Similarly, the gateway 604 may transform market data in an exchange-specific format received from the exchange 608 into a format understood by the trading device 602. The processing performed by the gateway 604 may also include tracking orders from the trading device 602 and updating the status of the order based on fill confirmations received from the exchange 608, for example. As another example, the gateway 604 may coalesce market data from the exchange 608 and provide it to the trading device 602.

In certain embodiments, the gateway 604 provides services other than processing data communicated between the trading device 602 and the exchange 608. For example, the gateway 604 may provide risk processing. Likewise, server side device 606 may provide similar risk processing as gateway 604.

The gateway 604 may include one or more electronic computing platforms such as a hand-held device, laptop, desktop computer, workstation with a single or multi-core processor, server with multiple processors, and/or cluster of computers, for example. Server-side device 606 may include a similar computer platform as gateway 604.

The gateway 604 may include one or more gateway applications. The gateway application(s) may, for example, handle order processing and market data processing. This processing may be based on user preferences, for example.

In certain embodiments, the gateway 604 communicates with the exchange 608 using a local area network, a wide area network, a virtual private network, a T1 line, a T3 line, an ISDN line, a point-of-presence, and/or the Internet, for example.

The exchange 608 is adapted to match orders to buy and sell tradable objects. The tradable objects may be listed for trading by the exchange 608. The orders may include orders received from the trading device 602, for example. Orders may be received from the trading device 602 through the gateway 604, for example. In addition, the orders may be received from other devices in communication with the exchange 608. That is, typically the exchange 608 will be in communication with a variety of other trading devices (which may be similar to trading device 602) that also provide orders to be matched.

As described above, the exchange 608 is adapted to provide market data. The market data may be provided directly to the trading device 602, for example. The market data may be provided to the trading device 602 through the gateway 604, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. As described above, the market data may also include information such as the last traded price (LTP), the last traded quantity (LTQ), and order fill information.

In certain embodiments, the system 600 includes more than one trading device 602. For example, multiple trading devices similar to the trading device 602, discussed above, may be in communication with the gateway 604 to send orders to the exchange 608.

In certain embodiments, the system 600 includes more than one gateway 604. For example, multiple gateways similar to the gateway 604, discussed above, may be in communication with the trading device 602 and the exchange 608. Such an arrangement may be used to provide redundancy should one gateway 604 fail, for example.

In certain embodiments, the system 600 includes more than one exchange 608. For example, the gateway 604 may be in communication with multiple exchanges similar to the exchange 608, discussed above. Such an arrangement may allow the trading device 602 to trade at more than one exchange through the gateway 604, for example.

In certain embodiments, the trading device 602 includes one or more computing devices or processing components. In other words, the functionality of the trading device 602 may be performed by more than one computing device. For example, one computing device may generate orders to be sent to the exchange 608 while another computing device may provide a graphical user interface to a trader. In certain embodiments, the gateway 604 includes one or more computing devices or processing components. In other words, the functionality of the gateway 604 may be performed by more than one computing device. In certain embodiments, the exchange 608 includes one or more computing devices or processing components. In other words, the functionality of the exchange 608 may be performed by more than one computing device.

In certain embodiments, the gateway 604 is part of the trading device 602. For example, the components of the gateway 604 may be part of the same computing platform as the trading device 602. As another example, the functionality of the gateway 604 may be performed by components of the trading device 602. In certain embodiments, the gateway 604 is not present. Such an arrangement may occur when the trading device 602 does not need to utilize the gateway 604 to communicate with the exchange 608, for example. For example, the trading device 602 may be adapted to communicate directly with the exchange 608.

In certain embodiments, the gateway 604 is physically located at the same site as the trading device 602. In certain embodiments, the gateway 604 is physically located at the same site as the exchange 608. In certain embodiments, the trading device 602 is physically located at the same site as the exchange 608. In certain embodiments, the gateway 604 is physically located at a site separate from both the trading device 602 and the exchange 608.

While not shown for the sake of clarity, in certain embodiments, the system 600 may include other devices that are specific to the communications architecture such as middleware, firewalls, hubs, switches, routers, exchange-specific communication equipment, modems, security managers, and/or encryption/decryption devices.

V. Example Cursor Prediction Methods in Relation to a Trading Interface

Figure 7:
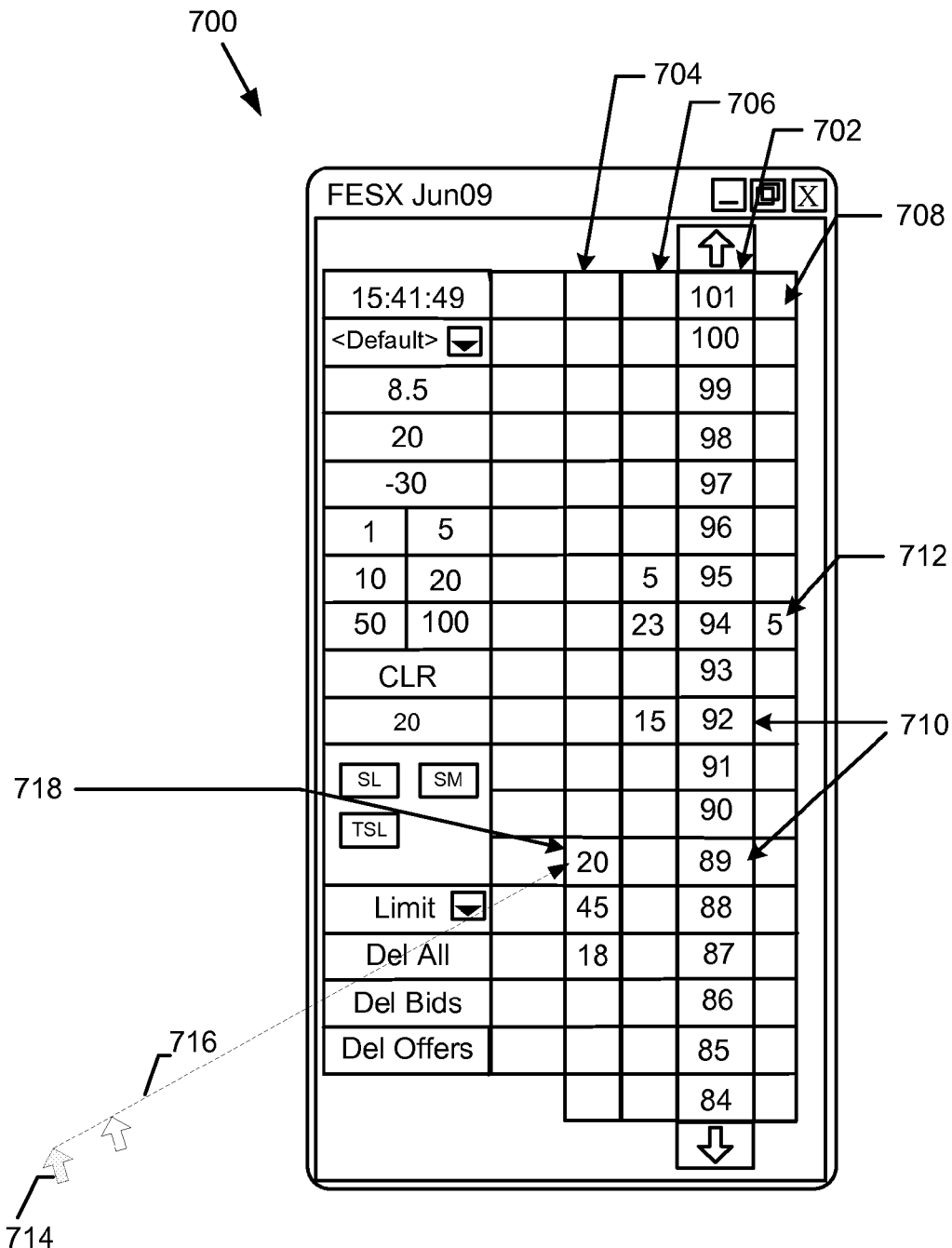
FIG. 7 illustrates an example trading interface for trading an item in an electronic trading system in which certain embodiments of cursor track prediction may be employed.

FIG. 7 illustrates an example trading interface 700 for trading a tradeable object in an electronic trading system in which certain embodiments of cursor track prediction may be employed. The trading interface 700 includes a price column 702, a bid quantity column 704, an ask quantity column 706, and a last traded price column 708 for the tradeable object. The price column 702 includes price levels (or values based on price). The bid quantity column 704 includes bid quantity indicators. The ask quantity column 706 includes ask quantity indicators. The bid quantity indicators and ask quantity indicators are aligned with the corresponding price level of the price column 702. The inside market 710 includes the best bid price and the best ask price. The last traded price column includes a last traded price indicator 712 that moves relative to the price levels along the price column 702. It should be understood that various other indicators could be provided as well.

FIG. 7 shows two positions for a selection cursor 714. Using a simple cursor track prediction method, a prediction track line 716 is projected in the direction of the movement, extending until it intersects with a specific region from a region set on the trading interface 700. According to one example embodiment, the first intersected region has one or more particular values for one or more order parameter values. In the example linear cursor track prediction model shown in FIG. 7, a target element 718 is intersected by the prediction track line 716 in the bid quantity column 704.

As explained above, once the prediction target is determined, the interface 700 may display the prediction track line 716 to indicate the current prediction target to a user. While FIG. 7 shows a line, it should be understood that various mechanisms could be used to visually indicate the current prediction targets. For example, a line or curve could have a particular style, such color, weight, solid/dotted/dashed, with or without line-begin and line-end symbols such as arrows. Additionally, the prediction track line could be displayed and continuously updated according to the current prediction target set. Also, more than one prediction line could be displayed as well. Additionally, depending on the type of the movement prediction algorithm used, a movement prediction indicator could include the entire prediction trajectory (not just a target), and the movement prediction indicator could be different than a line. For example, a "prediction curve" could be provided representing the predicted trajectory from the cursor position to the predicted target(s). It should be understood that the prediction track could have various other shapes depending on a specific movement prediction algorithm being used as well as the cursor movement.

According to another example embodiment, a visual indicator may be used in relation to a target element. For example, a target element could be color-coded. Alternatively, a shading pattern could be used in relation to an area corresponding to a target element. As shown in FIG. 7, an outline is drawn around a cell corresponding to the predicted target 718. It should be understood that any number of visual emphasis or indicators could be used depending on visual attributes associated with target elements. Additionally, as explained above, the visual emphasis of a target element could be accomplished by changing the visual appearance of some or all other elements of an interface.

As mentioned earlier, when the cursor 714 moves, one or more predictions of target elements are made, such as the element 718 in the bid quantity column 704. Based on the predicted target elements, one or more trade order parameters are preset for a trade order to be potentially sent to an electronic exchange. Based on the embodiment illustrated in FIG. 7, an order message for a buy order may be pre-generated based on the predicted target element 718, with a preset trade order price of "89" corresponding to the target element, and a default quantity predefined for the bid order region 704. According to another example embodiment, all possible messages may be generated ahead of time and stored in a main memory, a database, or a different storage medium. Then, prediction data may be used as a pointer to select specific messages from the database. As the cursor moves, the order parameters may be dynamically updated, or new messages may be selected, to reflect new target elements. When the cursor actually enters a particular region which is associated with a particular order parameter value, the process of the track prediction/parameter update may be suspended, as the proper order parameter value(s) have been already pre-set. Thus, a parameter prediction process is based on a track history relative to the interface geometry.

While the embodiment of FIG. 7 illustrates a cursor prediction method that results in a single prediction target, some cursor prediction methods, as described above, may generate multiple possible prediction targets, where each predicted target corresponds to a prepared order message which contains values for one or more order parameters. According to one example embodiment, multiple prediction targets may be associated with a probability value or a likelihood of selecting a particular target. When the probability of selecting a possible target is low, such a target may be removed from the set. Thus, as the cursor track prediction method operates, there is a set of possible orders, each completely specified in terms of its order parameters, and ready to be sent to an electronic exchange. In such an embodiment, as the cursor gradually approaches one particular target element, there are fewer target predictions, and hence fewer prepared orders in the set. Eventually, there could be a single target element in the target prediction set based on the cursor's track or history of movement.

According to one example embodiment, as the cursor track prediction process runs, it can dynamically and continuously update parameter values for orders in a prediction set, and appropriately add or remove prepared orders from the prediction set. Such an embodiment may be applied when multiple orders are prepared in advance, with each order associated with a probability of selection value. In such an embodiment, some orders may be removed from the set as the probability of selection value falls below a predefined threshold. Alternatively, parameter values in the prediction set may be updated only when there is a change in the prediction. In such an embodiment, orders may be added or removed from a prediction set when there is a change in the prediction.

Further, according to yet another example embodiment, market data displayed in relation to a trading interface may be automatically or manually repositioned, for example, to keep the inside market or yet some other item of interest substantially at the center, or at a desired location, on the trading interface. In such an embodiment, assuming that an initial target prediction is made prior to any repositioning, a fixed association may be created between a prediction track and one or more predicted target elements. Then, if the market data is repositioned after the prediction is made, the predicted target elements may remain the same until a user moves a cursor again and away from the predicted target, for example. To further assist a user, the cursor as well as the indication of the prediction track may be repositioned in relation to the trading interface as the market data is being repositioned on the trading interface. Different embodiments are possible as well.

Figure 8:
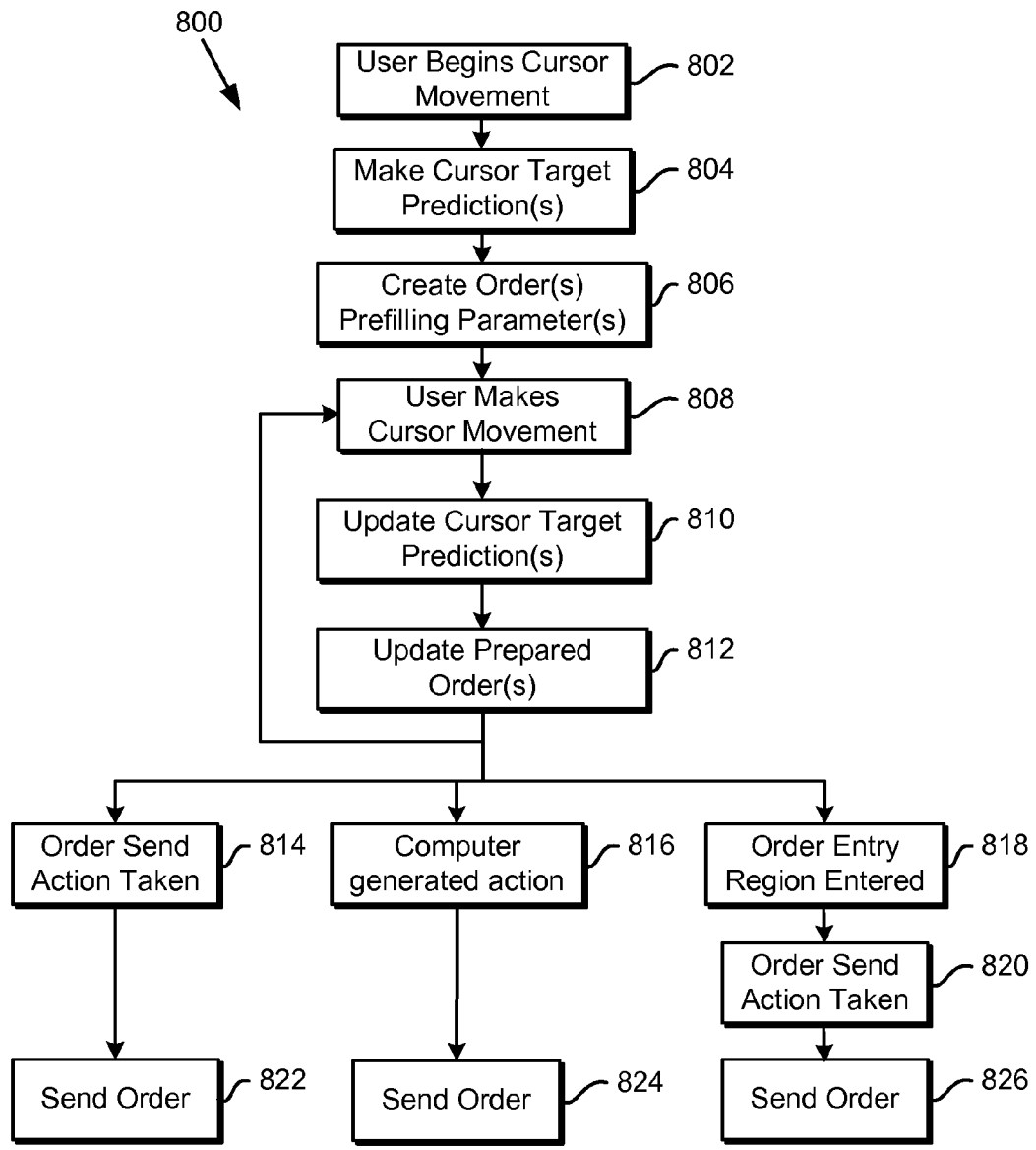
FIG. 8 is a flowchart illustrating an operation of certain embodiments described herein.

FIG. 8 is a flowchart 800 illustrating an operation of certain embodiments described herein. The flowchart 800 shows the functionality and operation of certain embodiments. In this regard, each block may be implemented alone or in combination in various forms of hardware, firmware, or as a set of instructions in software, for example. Certain embodiments may be provided as a set of instructions residing on a computer readable medium, such as a memory, hard disk, CD-ROM, DVD, or EPROM, for execution on a computer or other processing device. Alternative implementations are included within the scope of the example embodiments of the present invention in which functions may be executed out of order from that shown in flowchart 800 or discussed, including substantially concurrent or in reverse order, depending on the functionality involved, as would be understood by those skilled in the art.

At step 802, a user begins movement of a cursor. It should be understood that there could be a triggering action to enter the mode of target prediction tracking described herein. In such an embodiment, another action may be configured to exit the prediction tracking mode, the execution of which may terminate the process described in FIG. 8. Additionally, it should be understood that when more than one interface is displayed, the target prediction tracking described herein may be enabled in relation to one or more interfaces, while it may be disabled in relation to others.

As a user begins movement of a cursor, at step 804, an initial set of cursor target predictions is made. Based on the discussion above, the initial set of predictions could include a single prediction target element or several possible prediction target elements. When more than one target element is identified, each target element may be assigned a likelihood or probability of selection. As explained above, once the prediction target elements are determined, a number of visual mechanisms could be used to indicate the current prediction targets to a user.

At step 806, for each predicted target element, an order message is prepared with order parameters having values corresponding to the current defaults or values associated with each respective target element. For example, a default order quantity may be set for any order that is sent, while each target element may be associated with a specific order price and/or specific action (buy/sell). As mentioned above, order messages may be generated in advance. In such an embodiment, prediction data may be used to point to and select specific messages corresponding to the predicted target element(s). An order message may also include an order cancellation message when a predicted target element includes a working order indicator or yet some other indicator associated with an order cancellation action.

As the user continues to move the cursor at 808, the method 800 updates the prediction targets, as shown at 810. As explained above, updating may involve removing a possible cursor target from a set of predicted cursor targets, while adding new targets. A cursor target may be removed from the set when, for example, the probability or likelihood of a user targeting that location has dropped below a certain threshold value. Different embodiments could be used as well. As the cursor prediction targets are updated, the method updates/ adjusts the set of prepared order messages, as shown at 812. For example, orders may be removed from an order set when a particular cursor target is removed from the prediction set. Similarly, orders may be created and added to the set when a new target element is added to the prediction set. It should be understood that the process of the user moving the cursor and the method of updating cursor prediction targets and the prepared orders may continue, as shown with a loop between the steps 812 and 808.

The flowchart 800 shows three example embodiments relating to how and when a user can send an order. According to one embodiment, at 814, a user may take an order send action to send a particular order, as shown at 822, before the cursor gets to the target. An example of an order send action could be one or more clicks of a user input device, such as a click of a mouse button. In such an example embodiment, the order associated with the closest predicted target would be sent. It should be understood that the cursor may or may not enter the actual order entry region to send the order associated with the predicted target. According to another example embodiment that will be described in greater detail below, a user could click a different button of a mouse to send an order associated with the next closest predicted target (e.g., along a predicted line or motion track).

According to another example embodiment, a computer generated action may be detected, as shown at 816 (while in cursor prediction mode), to send the previously prepared order, as shown at 824. It should be understood that the order parameters for the sent orders may be prepared in advance to the cursor entering the region using the cursor track prediction methods described herein.

In another example embodiment, an order entry region is entered, as shown at 818. At this point, the prediction set may include a single prediction target with a single order message in the prediction set. In another alternative embodiment, the prediction set may include a number of prediction targets further along or nearby a predicted motion track. Subsequently, a user may take an order send action, as shown at 820, to send one or more previously prepared orders to an electronic exchange, as shown at 826. In such an embodiment, a user could indicate which of the orders should be sent by taking another user action that selects a specific target element.

In yet another element, once target elements are identified, one or more actions to be taken based on the target elements may be displayed via another interface that allows a user to select a desired action. For example, the interface could display and dynamically update order messages that may be sent based on the identified target elements. In such an embodiment, the interface could allow a user to select and to send a desired message. For example, the interface could be displayed in relation to a moving cursor. A user could also activate and deactivate the display of the interface in relation to the cursor. Further, according to yet another embodiment, rather than executing a desired action upon receiving a predetermined input, a confirmation window could be provided to allow a user confirm the action to be taken, such as to confirm a message to be sent to an electronic exchange.

VI. Multiple Cursor Track Prediction Targets

As explained above, many different motion prediction algorithms could be used. While some of the algorithms may identify a single motion track, they may lead to having multiple predicted cursor targets, each somewhere along the predicted motion track, depending on the layout of an interface. Other motion prediction algorithms could determine the likelihood or probability of multiple different motion tracks, each of which having a plurality of associated cursor targets, such as explained in relation to FIG. 4.

Figure 9:
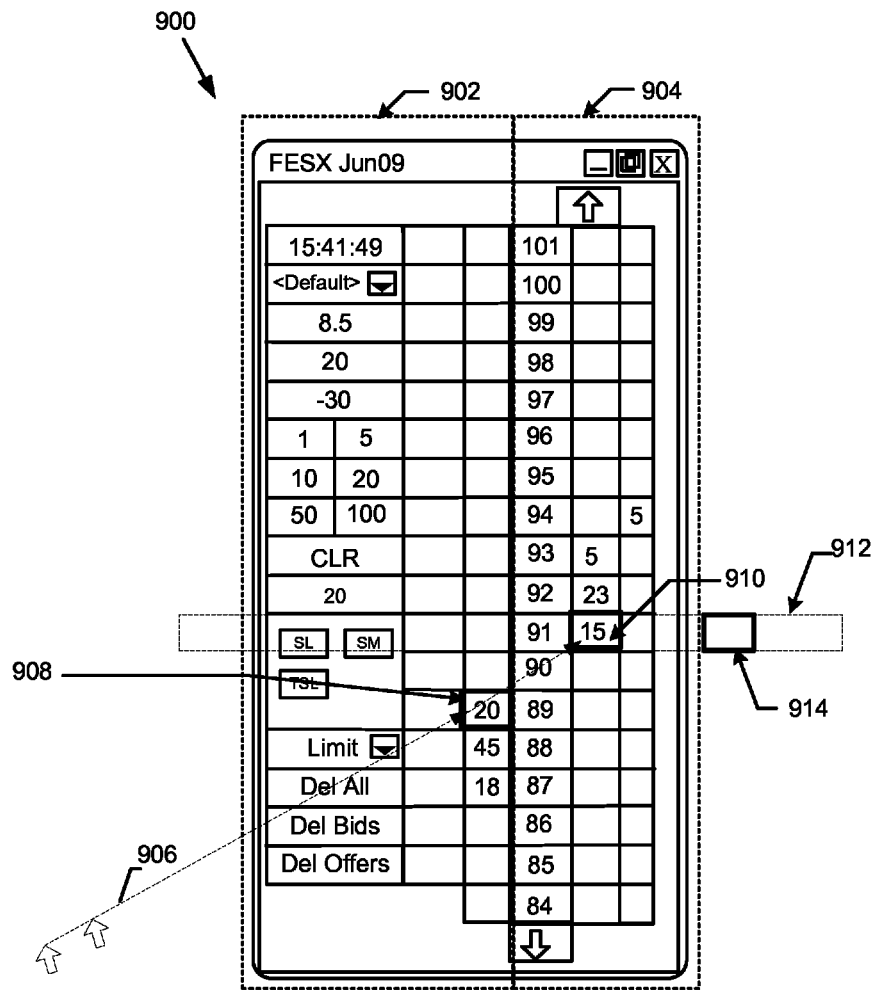
FIG. 9 illustrates one example trading interface for trading an item in an electronic trading system in which multiple track prediction targets are involved.

FIG. 9 illustrates one example trading interface 900 for trading an item in an electronic trading system in which multiple track prediction targets are involved. According to the example embodiment of FIG. 9, multiple regions may be associated with distinct values for one or more order parameters defined for each respective region. In such an embodiment, a user action may set a value for one more order parameters of prepared orders based on a selection of a specific region. Alternatively, in the embodiment where many orders are preconfigured ahead of time, target prediction data in combination with the region selection may be used to select certain preconfigured orders. As will be described in greater detail below, a user action, such as a predetermined input, may select a desired region. Alternatively, cursor movement, such as when a cursor crosses a region, may select a desired region.

FIG. 9 illustrates a region set including two regions 902 and 904 associated with distinct values for the order parameter "BUY" vs. "SELL." The regions 902 and 904 are overlaid directly over the trading interface 900. However, it should be understood that the size of the regions 902 and 904 can vary based on user configuration. For example, each column of the trading interface 900 could be associated with a different region. Further, alternatively, one or more regions could be defined outside the boundaries of the trading interface, as will be described in greater detail below. Additionally, the region boundaries could not coincide with the natural boundaries of any user interface element. For example, they could contain more area than just the interface element.

It should be understood that the regions may be invisible to a user, or they may be shown via a visual indication while a cursor is being repositioned in relation to the interface 900. Alternatively, a user may activate and deactivate various regions, based on the user's preferences. Further, a region may be shown only when it is activated. Optionally, a visual indication may be provided in relation to each region showing a specific parameter associated with each region and/or a particular value predefined for each region.

Referring back to FIG. 9, the region 902 is associated with a "BUY" order parameter, and the region 904 is associated with a "SELL" order parameter. As illustrated in FIG. 9, using a linear track prediction method, a cursor prediction track 906 intersects two target elements 908 and 910 positioned in regions 902 and 904, respectively. As explained earlier, as the cursor is being moved, two orders may be preconfigured based on the predicted target elements 902 and 904. Alternatively, two orders may be selected from a preconfigured pool of order messages.

According to one example embodiment, two indicators such as "1" and "2" may be displayed in relation to the predicted target elements 908 and 910. In such an embodiment, a user may enter an input "1" to select the predicted target element 908 and/or to eliminate the target element 910, or "2" to select the predicted target element 910 and/or to eliminate the target element 908. It should be understood that other indicators could also be used, and may be associated with other user input actions as well. For example, when the element 908 is selected, order parameters of an order prepared based on the element 908 may be determined based on a region in which the element 908 is located. Thus, in the example of FIG. 9, the controlling parameters, such as an order quantity defined with respect to the region 902, may be based on the order quantity associated with the region 902. Alternatively, a user may select a different region to be used for setting order parameters for an order prepared based on the selected target element. For example, while a user may select the target element 908, the order parameters for the prepared order may be set based on the order parameters associated with the region 904.

Furthermore, in an alternative embodiment, some order parameters may be set for an order based on order parameters associated with a region in which the selected target element is located, while a user may select a different region to set additional order parameters. Further, alternatively, a user may select one of the regions as a default region, and order parameters associated with the selected region may be used to set all or some order parameters for orders prepared based on the predicted targets. Further, alternatively, a specific region may be selected upon detecting a cursor of a user input device crossing the region. In such an embodiment, when the cursor crosses the region, one or more parameters may be preset for a prepared order. In other words, some prepared orders may be eliminated while others may be added based on a user's selection of different regions. It should be understood that various other embodiments are possible as well.

According to one example embodiment, a user may enter an order prior to a cursor reaching one of the regions. For example, while still outside one of the regions, such as shown in FIG. 9 with the cursor located at $L_1$, a user may initiate a first action of a user input device to select a specific target element, while a second action of the user input device may be used to send an order to an electronic exchange. Alternatively, multiple actions can be used to select a desired target element, to select a desired region to control order parameter settings for an order prepared based on the selected target element, and to send the prepared order. Alternatively, a single action may both select a specific target element and to send an order to an electronic exchange. In such an embodiment, order parameters for the prepared order may be determined based on a region in which the target element is located, based on an earlier selected region, or based on a default region.

It should be understood that more than one user input device may be used to select a specific region, a desired target element, and to send an order to an electronic exchange. According to one example embodiment, a first action may be initiated by selecting a specific key on a keyboard to select a desired region, a second action may be initiated to select a desired target element, while another action may be initiated using a mouse, such as by clicking a mouse button, to send an order to an electronic exchange. Further alternatively, a user could select a desired target element by selecting a region in which the desired target element is located. Various other embodiments are possible as well.

According to another example embodiment, each region may be associated with more than one order parameter. More specifically, the region 902 may be associated with the "BUY" order parameter and a first order type ("OT1"), while the second region 904 may be associated with the "SELL" order parameter and a second order type ("OT2").

It should be understood that region sets can be constructed in any manner. While the regions of FIG. 9 are vertical, horizontal regions, or regions at various angles could be created as well. Additionally, two sets of regions could be used in relation to a single interface, with the two sets of regions intersecting and being associated with different order parameters. It should be understood that in an embodiment where more than one cursor is being used in relation to an interface, different regions may be associated with different cursors.

Additionally, it should be understood that selection of specific regions may result in generating additional target elements. For example, a horizontal region 912 may be created in relation to the price level of "91." In such an embodiment, when the target element 910 is identified, a user may activate the region 912 to identify additional target elements, such as the target element 914 that may be associated with the price of "91" but a different order quantity, or yet some other order parameter, than that associated with the target element 910. As described above, each target element may be labeled with an identifier such that a user may quickly select a desired target element. Additionally, another window may be displayed in relation to each predicted target element indicating current order parameters associated with each target element. When multiple regions are used, a window displayed in relation to a predicted target element may indicate various combinations of order parameters for orders prepared for the predicted target element. In such an embodiment, the window may also display an input combination that activates selection of a specific prepared order.

Figure 10:
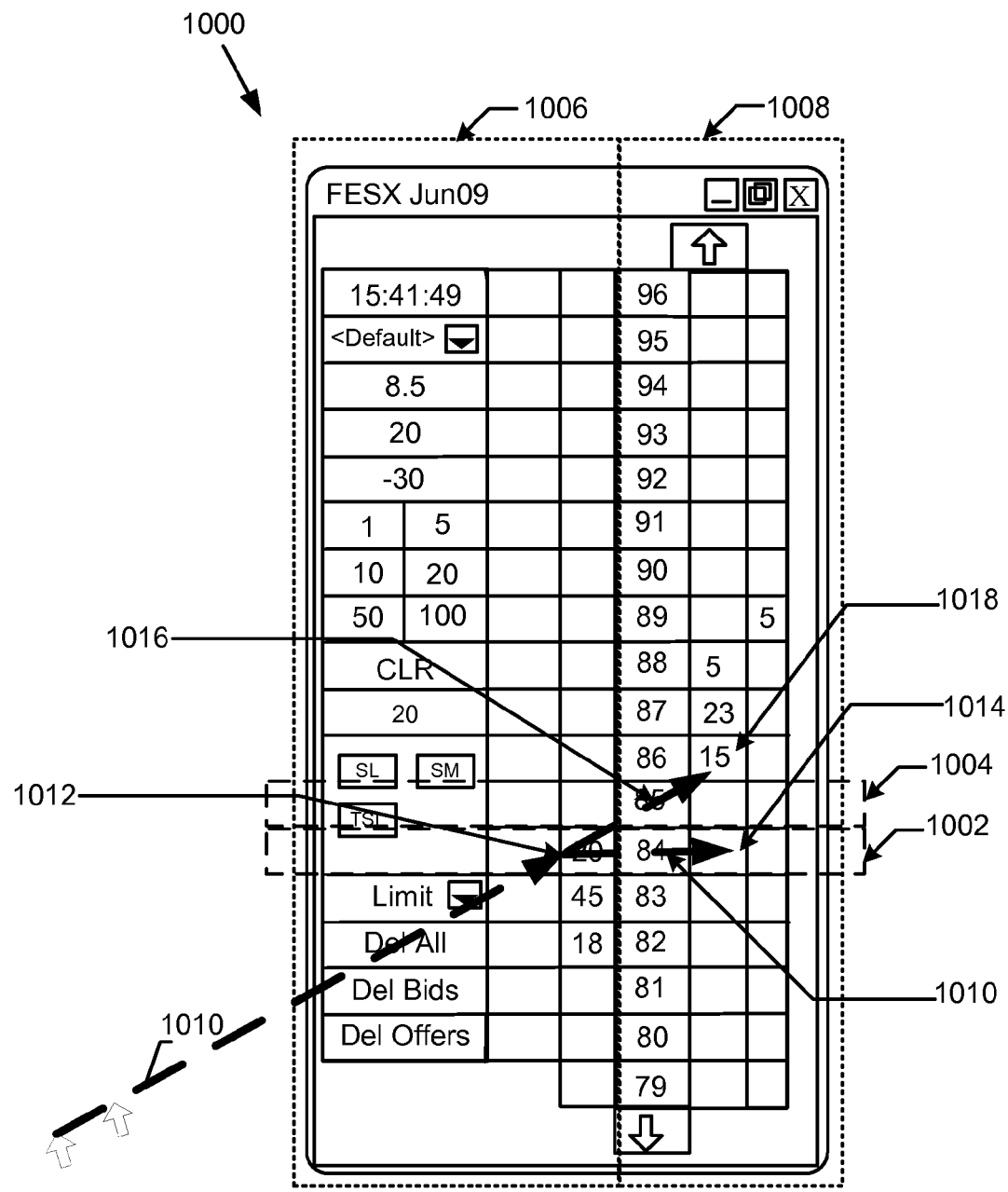
FIG. 10 illustrates an example trading interface for trading an item in an electronic trading system using a plurality of region sets.

FIG. 10 illustrates an example trading interface 1000 for trading an item in an electronic trading system using a plurality of region sets.

According to the embodiment of FIG. 10, the first region set includes a plurality of horizontal regions associated with a plurality of prices, such as regions 1002 and 1004 associated with prices of "84" and "85," respectively. Then, the second region set includes two vertical regions 1006 and 1008 corresponding to a "BUY" order parameter and a "SELL" order parameter, respectively. In such an embodiment, a linear prediction track 1110 intersects the region 1002 corresponding to the price of "84." Using the linear track prediction functionality and the region layouts of FIG. 10, two target elements 1012 and 1014 may be identified corresponding to an order to buy at the price of "84" and an order to sell at the price of "84." According to one example embodiment, rather than pre-configuring orders or selecting orders from a preconfigured pool of messages based on all possible target elements, the prediction logic may eliminate certain target elements based on which targets are more likely intended by a user, or more likely to be selected.

According to another example embodiment, a second prediction track 1016 may be generated using a cursor prediction method. In such an embodiment, two target elements 1012 and 1018 could be identified. Based on the target elements 1018 and 1020, an order to buy at "84" and an order to sell at "86" could be pre-configured or selected from a preconfigured pool of messages.

It should be understood that a priority level could be defined for each region set, such that when multiple prediction tracks are generated, one or more of them may be selected based on the priority level defined for each region. For example, if the price-based region set has the highest priority level in FIG. 10, the prediction track 1016 could be eliminated, and thus, the target 1018 could be eliminated from the consideration while pre-configuring one or more orders. Different embodiments are possible as well, where a user may select a specific prediction track when more than one prediction track is available.

Figure 11:
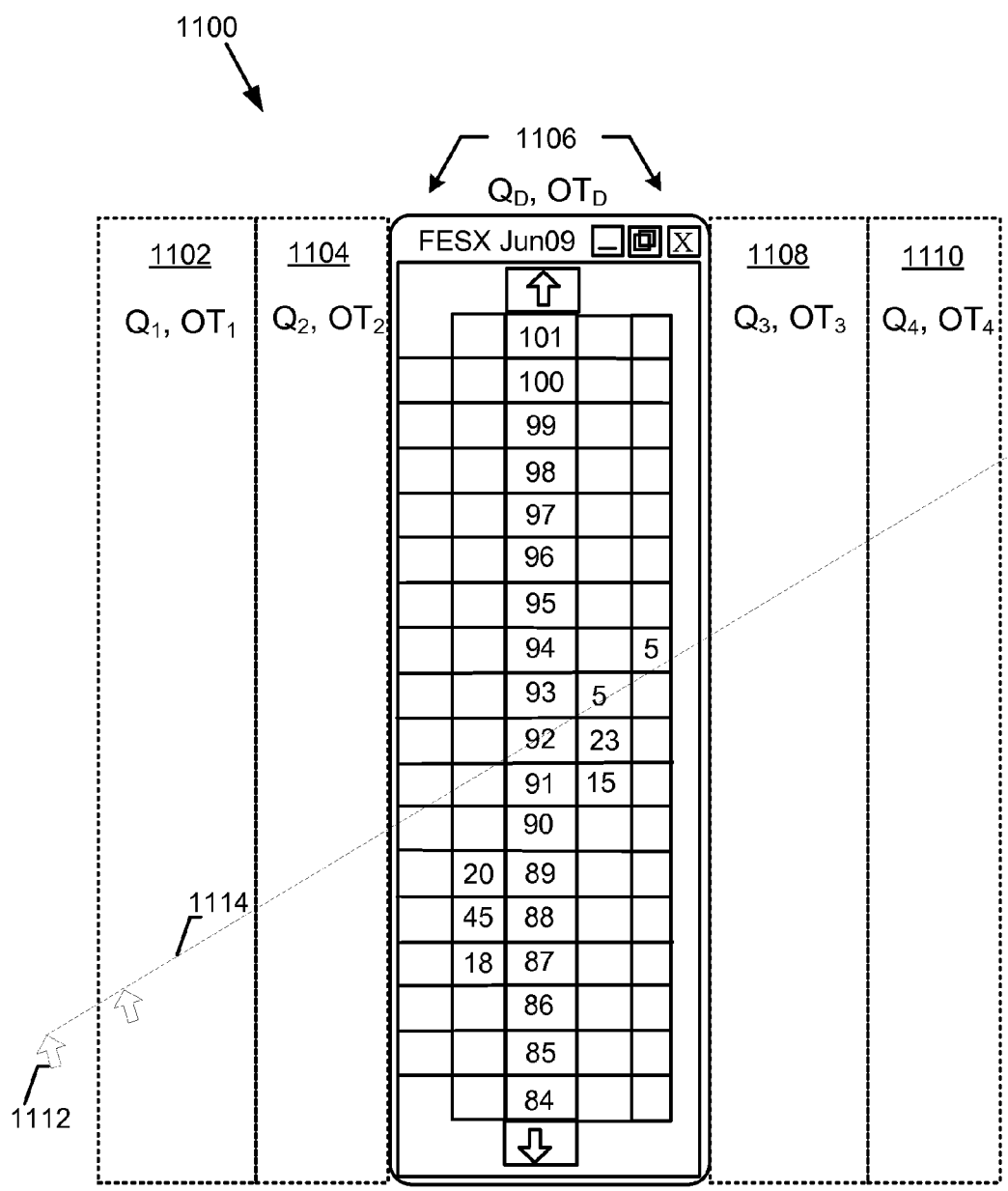
FIG. 11 illustrates another example trading interface using a plurality of regions extending beyond the trading interface.

FIG. 11 illustrates another example trading interface 1100 using a plurality of regions extending beyond the trading interface. Similarly to the embodiments described above, each of the plurality of regions may be associated with a value preset for one or more order parameters. FIG. 11 illustrates five regions 1102-1110, with the region 1106 overlapping the trading interface 1100, and four additional regions 1102, 1104, 1108, and 1110 displayed outside the trading interface 1100. As illustrated in FIG. 11, each region is associated with different order parameters. For example, the region 1102 corresponds to a first order quantity ("$Q_1$") and a first order type ("$OT_1$"), while the second region 1104 corresponds to a second order quantity ("$Q_2$") and a second order type ("$OT_2$"). The quantities and order types associated with each region may be user-configurable. Additionally, various other parameters could be defined in relation to each region in addition to, or instead of the quantity and order type parameters.

As a cursor 1112 is being moved in relation to the trading interface 1100, one or more cursor prediction methods could be used to predict at least one target element. Using a linear prediction method, a target element 1114 corresponding to a price of "87" and an order parameter "BUY" may be identified on the trading interface 1100. According to one example embodiment, an order to buy at the price of "87" may be pre-configured based on the target element 1114. Additionally, as the cursor crosses the boundary of each region, additional order parameters may be set for the pre-configured order. For example, as the cursor crosses the region 1102, an order quantity of $Q_1$ and an order type of $OT_1$ may be set for the pre-configured order. Alternatively, rather than setting order parameters for an order at the time when the cursor crosses a specific region, all possible messages may be generated ahead of time, and then certain messages may be selected based on the cursor movement in relation to each region and further based on cursor prediction data.

Alternatively, rather than setting additional order parameters or selecting different preconfigured messages as the cursor 1112 crosses each respective region, a user could enter a predetermined input to select a desired region. The region selection may then define one or more parameters for a pre-configured order message or may result in selection of a different preconfigured order message. Then, to send the pre-configured order to an electronic exchange, the user could enter another predetermined input. Alternatively, a single action may be used to select a desired region, a desired target, and to send an order message associated with the desired target. Additionally, when one or more target elements are identified, a user could also pre-select one of the target elements before indicating which of the regions should be selected. It should be understood that more than one user input device could be used for selecting one of the regions, target elements, and sending trade orders. Also, it should be understood that different regions could be associated with different order parameters. For example, the region 1102 could correspond to a specific order quantity value, while the region 1104 could correspond to an order type. In such an embodiment, a user could select a combination of regions to define desired order parameters for a trade order. Different embodiments are possible as well. Additionally, it should be understood that various indicators could be displayed in relation to the regions and target elements to assist a user in determining what user inputs can be used to activate/select a desired region/target element. Various other combinations described above could be used to select a desired target element, to define order parameters for a preset order, and to send one or more orders to an electronic exchange.

As used herein, a "tradable object" refers to anything that can be traded with a price, a quantity, or both price and quantity. For example, financial products such as stocks, options, bonds, futures, currency, warrants, funds derivatives, commodities, and collections or combinations of these may be tradable objects. A tradable object may be "real" or "synthetic." A real tradable object includes products that are listed by an exchange. A synthetic tradable object includes products that are defined by the user and are not listed by an exchange. For example, a synthetic tradable object may include a combination of real (or other synthetic) products such as a synthetic spread. A tradable object may also include traded events or goods, for example.

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

What is claimed is:

1. A method for motion based target prediction and interaction, comprising:
receiving a first user input by an electronic trading device to move a cursor;
detecting movement of the cursor from a location without a set of selectable elements towards the set of selectable elements, where each selectable element of the set of selectable elements comprises an order parameter for an order for a tradeable object;
in response to detecting the movement of the cursor, predicting by the electronic trading device a trajectory path of the cursor toward a first target element of the set of selectable elements, the trajectory path being predicted according to at least a first location without the set of selectable elements along the movement of the cursor and a second location without the set of selectable elements along the movement of the cursor;
in response to predicting the trajectory path of the cursor toward the first target element and prior to the cursor reaching the first target element, identifying by the electronic trading device, a first order parameter for a first order related message for an order for the tradeable object as an order parameter for the first target element;
in response to predicting the trajectory path of the cursor toward the first target element and prior to the cursor reaching the first target element, setting by the electronic trading device the first order parameter for the first order related message for the tradeable object; and
in response to setting of the first order related message, initiating by the electronic trading device submission of the first order related message to an electronic exchange.

2. The method of claim 1, wherein setting the first order related message comprises generating the first order related message in response to predicting movement of the cursor toward the first target element.

3. The method of claim 1, further comprising:
generating one or more order related messages based on the set of selectable elements prior to predicting movement of the cursor toward the first target element, and wherein setting the first order related message comprises selecting the first order related message from the generated one or more order related messages.

4. The method of claim 1, wherein initiating submission further comprises:
processing the first order related message such that the first order related message is ready for sending onto a physical communication medium upon detecting a trigger signal.

5. The method of claim 1, where initiating submission further comprises:
providing the first order related message to a gating element; and
releasing the first order related message from the gating element upon detecting a trigger signal.

6. The method of claim 1, where initiating submission further comprises:
    selecting the first target element; and responsively,
    causing the first order related message to be sent to the electronic exchange.

7. The method of claim 6, wherein the first target element is selected prior to the cursor being positioned over a selectable area for the first target element.

8. The method of claim 6, wherein the first target element is selected when the cursor is positioned over a selectable area for the first target element.

9. The method of claim 1, wherein the order parameter corresponding to the first target element comprises an order price.

10. The method of claim 1, wherein the order parameter corresponding to the first target element comprises an order quantity.

11. The method of claim 1, wherein the order parameter corresponding to the first target element defines an order as a buy order.

12. The method of claim 1, wherein the order parameter corresponding to the first target element defines an order as a sell order.

13. The method of claim 1, wherein the order parameter corresponding to the first target element comprises an order type.

14. The method of claim 1, further comprising:
    providing a graphical indicator to indicate the first target element.

15. The method of claim 1, where the first user input further moves the cursor from the location without the set of selectable elements toward a second target element of the set of selectable elements, the method further comprising:
    in response to the cursor being moved toward the second target element and prior to the cursor reaching the second target element, setting by the electronic trading device a second order related message with an order parameter for the second target element.

16. The method of claim 15, where initiating submission further comprises:
    selecting a desired target element from the first target element and the second target element; and
    causing the first order related message or the second order related message to be sent to the electronic exchange based on the selected desired target element.

17. The method of claim 16, wherein the desired target element is selected by a user.

18. The method of claim 16, wherein the desired target element is selected based on a predefined parameter.

19. The method of claim 1, wherein the first order related message comprises a message to cancel an order at a price at the electronic exchange.

* * * * *